Aug. 27, 1963  D. COHN  3,101,993
METHODS OF AND APPARATUS FOR MAKING DOLLS' HEADS
WITH ROTATING DOLLS' EYES
Filed Jan. 4, 1960  5 Sheets-Sheet 1

INVENTOR.
DAVID COHN
BY
J.B. Feldman
ATTORNEY.

Aug. 27, 1963

D. COHN 3,101,993

METHODS OF AND APPARATUS FOR MAKING DOLLS' HEADS WITH ROTATING DOLLS' EYES

Filed Jan. 4, 1960

INVENTOR.
DAVID COHN

BY

*J. B. Feldman*

ATTORNEY.

Aug. 27, 1963

D. COHN 3,101,993

METHODS OF AND APPARATUS FOR MAKING DOLLS' HEADS WITH ROTATING DOLLS' EYES

Filed Jan. 4, 1960

INVENTOR.
DAVID COHN

BY

J. B. Feldin
ATTORNEY.

INVENTOR.
DAVID COHN
BY
J.B. Feldman
ATTORNEY.

Aug. 27, 1963

D. COHN 3,101,993

METHODS OF AND APPARATUS FOR MAKING DOLLS' HEADS
WITH ROTATING DOLLS' EYES

Filed Jan. 4, 1960

INVENTOR.
DAVID COHN

BY

J. B. Felshin

ATTORNEY.

United States Patent Office 3,101,993
Patented Aug. 27, 1963

3,101,993
METHODS OF AND APPARATUS FOR MAKING DOLLS' HEADS WITH ROTATING DOLLS' EYES
David Cohn, Pound Ridge, N.Y., assignor to Model Plastic Corporation, White Plains, N.Y., a corporation of New York
Filed Jan. 4, 1960, Ser. No. 397
10 Claims. (Cl. 18—59)

This invention relates to methods of and apparatus for making dolls' heads with rotating dolls' eyes.

One object of this invention is to improve upon the method and apparatus disclosed in my copending application Serial No. 766,544, filed Oct. 10, 1958, and issued as U.S. Patent No. 3,015,856.

In my said copending application Serial No. 766,544, there is disclosed apparatus and method for blow molding a doll's head with rearwardly opening sockets to receive doll's eyes. However, such sockets were so constructed that the doll's eyes had to be rotatably mounted in casings which were attached to the sockets by means of prongs thereon gripping the outer sides of the sockets as disclosed in my copending applications, Serial No. 766,827, filed Oct. 13, 1958, and now abandoned; Serial No. 776,544, filed Nov. 26, 1958 and Serial No. 783,939, filed Dec. 30, 1958, and now abandoned. Such attachments necessitated special tools such for example as disclosed in my copending application, Serial No. 772,538, filed Nov. 7, 1958, and issued as U.S. Patent No. 2,973,573.

Another object of this invention is to provide a highly improved method and apparatus of the character described in which the doll's head is blow molded with integral rearwardly opening sockets to receive the doll's eyes, and with holes in the sockets to receive axles on the doll's eyes.

Yet another object of this invention is to provide an improved method and apparatus of the character described, in which said openings are bearing openings which pivotally receive said axles.

Still another object of this invention is to provide method and apparatus for incorporating shells for dolls' eyes into said sockets, with said sockets having openings receiving tubular eyelets on the shells, which eyelets serve to receive the axles on the dolls' eyes.

Still another object of this invention is to provide an improved method and apparatus for blow molding a doll's head with integral, rearwardly opening eye sockets, with shells for doll's eyes embedded in the sockets, said shells having openings to receive axles for doll's eyes in said shells, and said sockets having openings registering with the openings in the shell and into which said axles project.

A still further object of this invention is to provide a highly improved method and apparatus of the character described which shall be relatively inexpensive, and yet practical and efficient to a high degree.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown an illustrative embodiment of this invention, FIG. 1 is a top view of blow molding apparatus embodying the invention;

Figure 1:
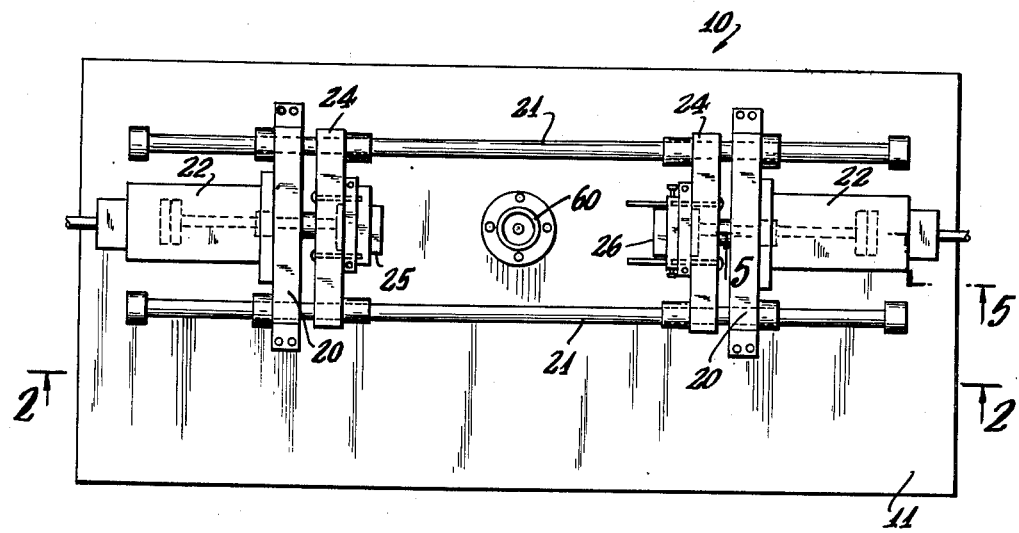

Referring now in detail to the drawing 10, designates apparatus embodying the invention. The same comprises a table or stand 11, at the middle of which is a collar 12 passing up through a hole 13 in the stand and fixed thereto.

Beneath the stand is an air cylinder 14 provided with an air nozzle 15 passing up through a central opening in the collar 12. Suitable solenoids may be provided to move the nozzle 15 up and down, when desired, and suitable valve means may be provided to cause air under pressure to flow through the nozzle when desired.

On the stand are a pair of upright stanchions 20 supporting a pair of parallel, horizontal, co-planar rods 21. Fixed to the stanchions 20 are cylinders 22 extending outwardly therefrom and in each of which is a piston 23 provided with piston rod 23a. Passages 22a and 22b are provided in each cylinder to feed air to one side or the other of the piston. Thus, the pistons can be made to move either inwardly toward each other, or outwardly away from each other. Any suitable controls may be provided to effect movement of the pistons inwardly and outwardly when desired.

Attached to the inner ends of the piston rods are cross-heads 24 having suitable openings to slidably receive the horizontal rods 21. On one cross-head 24 is a rear hollow doll's head mold section 25, and on the other, is a front hollow doll's head mold section 26. These mold sections, when brought together will form a complete female head mold. The molds may have lower neck forming portions 25a, 26a formed with semi-circular notches 25b, 26b to fit around the air nozzle 15. Otherwise, the mold sections 25, 26 have meeting edges 25c, 26c.

Mold section 26 has a pair of concave doll's eye opening shaped surfaces 30, and horizontal longitudinal through openings 31 of polygonal transverse cross-section, communicating with the middle of said concave surfaces. Said mold section 26 also is formed with a screw threaded hole 33 at right angles to, and extending to each opening 31.

Mounted on the mold section 26 are a pair of metal eye socket molding members 35. Each member 35 has a shank 36 of polygonal cross-section slidably and non-rotatably mounted in opening 31. At the inner end of each shank is a head 37. Each head 37 has a convex surface 38 part of which nests within a concave surface 30, and part of which extends therebeyond. At its sides, each head has flat, vertical parallel surfaces 39. Each head has an inner flat vertical surface 40. The flat surfaces 39 are connected by part cylindrical surfaces 41.

Thus, convex surfaces 38 meet the inner surfaces 32 of the mold section 26 along continuous outlines defining eye openings for the doll's head.

Mounted, or nested on each head 37 is a shell 45 for a doll's eye 46.

Each shell 45 (FIGS. 9, 10 and 12) has a hollow, concave-convex portion 48 contacting surface 38 of the head 37, and formed with an eye opening 49 shaped to the outline of concave surface 30. Said shell also has side flat walls 50 contacting flat side surfaces 39 of the head 37, and part cylindrical walls 51 contacting surfaces 41 of said head. Said side flat walls 50 have horizontal aligned, opposed axle openings 52 and extending outwardly from said flat walls are opposed, horizontal tubular projections or members 53 communicating with the openings 50, and closed at their outer ends.

The flat surfaces 40 of the heads 37 are in the planes of the inner edegs 54 of the shells.

Each shank 36 has a recess 36a to receive the inner end of a set screw 34 screwed in openings 33 to hold the element 35 in place until it is desired to move or remove the latter.

Figure 2:
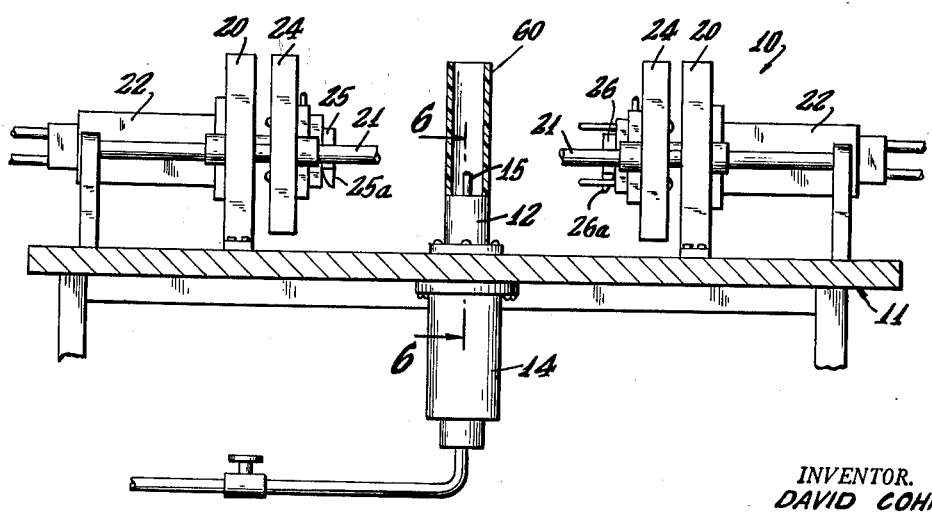
FIG. 2 is a cross-sectional view taken on line 2—2 of FIG. 1.
Figure 3:
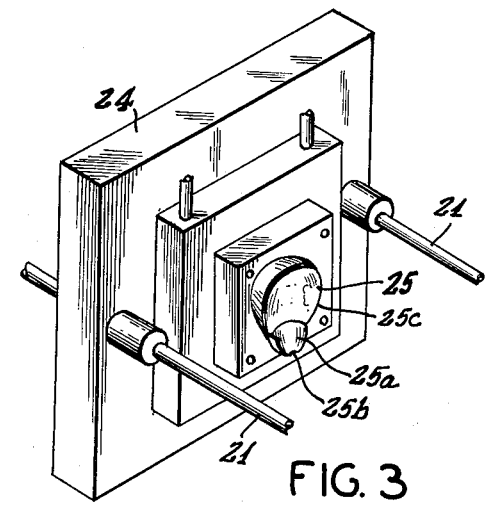
FIG. 3 is a perspective view of one end of the apparatus shown in FIGS. 1 and 2.
Figure 12A:
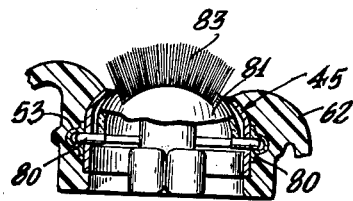
FIG. 12a is a cross-sectional view taken on line 12a—12a of FIG. 12.

A tube 60 of heated thermoplastic material may be fed or placed, as shown in FIG. 2, in vertical coaxial position with respect to nozzle 15, while the cross-heads are apart. The lower end of the tube 60 receives said nozzle and comes down to collar 12. Then the cross-heads are moved inwardly toward each other by feeding air to passages 22b of cylinders 22. The tube 60 will be pinched by the upper and lower parts of mold sections 25, 26. At this time, air nozzle 15 is up.

Figure 8:
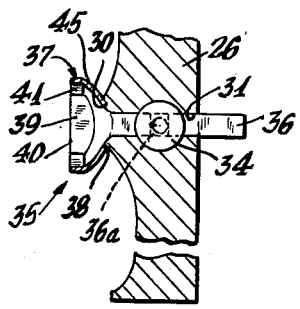
FIG. 8 is a cross-sectional view illustrating further the apparatus shown in FIG. 7 and part of one mold section.

Also at this time, the members 35 are in place in the mold sections, with shells 45 thereon, as in FIG. 8.

After the mold sections are brought together, air is blown up through the nozzle 15 to expand tube 60 against the inner surfaces of the mold sections 25, 26 to blow mold the doll's head 61.

Figure 9:
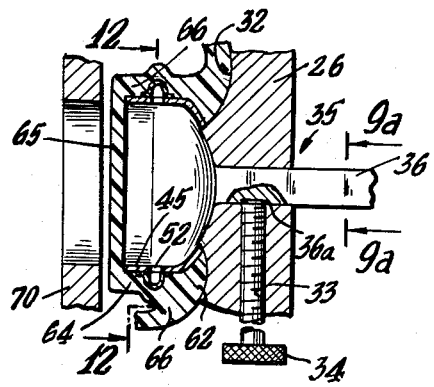
FIG. 9 is a horizontal cross-sectional view of said apparatus illustrating the method for cutting away part of the molded socket.
Figure 9A:
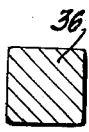
FIG. 9a is a cross-sectional view taken on line 9a—9a of FIG. 9.
Figure 10:
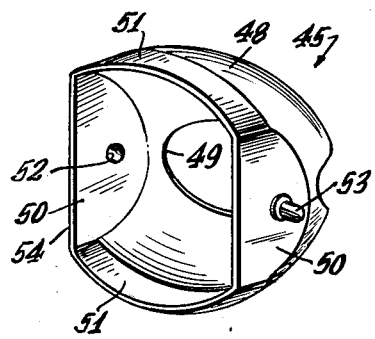
FIG. 10 is a perspective view of one of the eye shells embedded in the socket blow molded with the improved apparatus.

As shown in FIG. 9, there is thus blow molded a doll's head having a front face portion 62 with eye openings 63. Extending from the front face portion 62 are eye socket portions 64 contacting the shells 45, and having front portions 65 contacting the front faces 40 of the heads 37. The portions 64 are provided with outwardly extending closed tubular portions 66 forming openings surrounding and receiving the tubular portion 53 on the shells.

After the expanded tube or molded head has cooled, the air nozzle is moved down below the molded head, and the cross-heads 24 are moved apart by feeding air to passages 22a and exhausting through passages 22b.

A portion 61a of the back of the head may be cut away, and ring dies 70 inserted into the head. Said ring dies 70 should have inner die surfaces corresponding to the peripheries of heads 37.

After retracting screws 34, the rear ends of the shanks 36 may be struck to cut away walls 65 against the dies 70. Then the dies 70 may be removed, and the members 35 may be removed from the heads, leaving the shells 45 embedded in the sockets 64. Portions of the sockets 64 will remain against the outer edges of eye shells 45.

Figure 11:
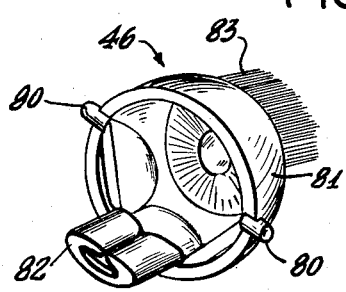
FIG. 11 is a rear perspective view of a rotating doll's eye to be received in the shell of FIG. 10.

Each doll's eye 46 has axles 80, as shown in FIG. 11. They may be inserted into sockets 64 with the axles 80 engaged through holes 52 and into the tubes 53. The shells must be pressed together top and bottom to expand the sides thereof sufficiently to permit insertion of the doll eye axles.

The doll's eyes 46 may be of any usual construction and each has an eyeball 81, a weighted arm 82 and eyelashes 83.

Members 35 may be heated before use, if desired.

Also, the walls 65 may be cut by a knife or in any other suitable manner if desired, instead of using dies 70.

Figures 12, 13, 13A:
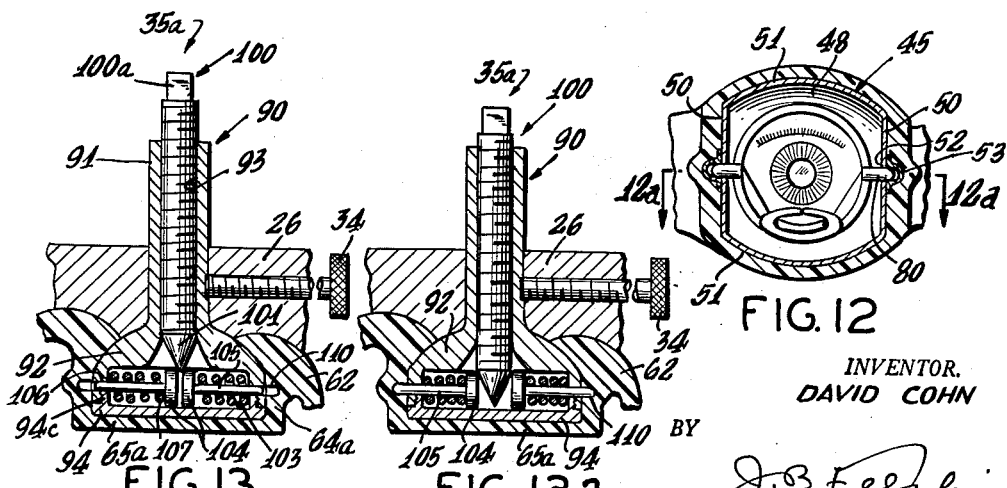
FIG. 12 is a cross-sectional view taken on line 12—12 of FIG. 9, but showing a doll's eye inserted in the shell and socket after the rear of the socket has been cut away.
FIG. 13 is a view similar to FIG. 8 but illustrating a modified apparatus for making the sockets without embedded shells.
FIG. 13a is a view similar to FIG. 13 but showing another position of the apparatus.
Figure 16:
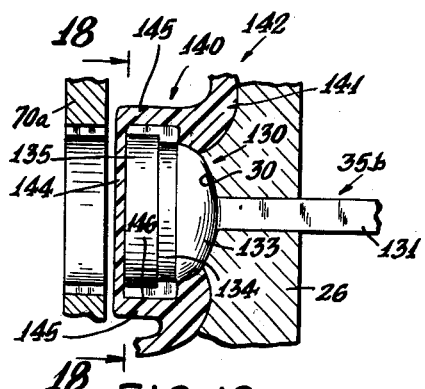
FIG. 16 is a horizontal cross-sectional view illustrating a still further modified method and apparatus embodying the invention.
Figure 17:
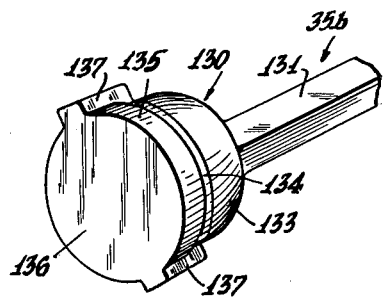
FIG. 17 is a perspective view of the eye socket molding member of FIG. 16.
Figure 18:
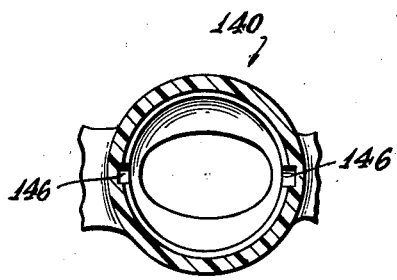
FIG. 18 is a cross-sectional view taken on line 18—18 of FIG. 16.
Figure 19:
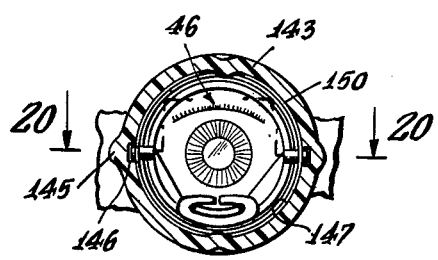
FIG. 19 is a view similar to FIG. 18 but with an eye in the socket.
Figure 21:
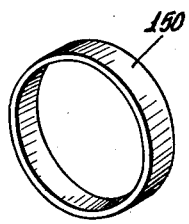
FIG. 21 is a perspective view of the ring to hold the eye in place as in FIGS. 19 and 20.
Figure 20:
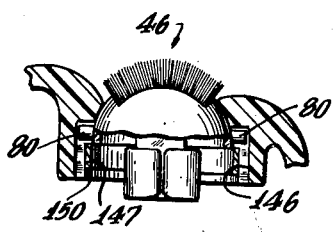
FIG. 20 is a cross-sectional view taken on line 20—20 of FIG. 19.

In FIGS. 13, 13a there is shown a modified socket forming member 35a which may be used instead of member 35, when not employing shells 45. Member 35a comprises a member 90 having a square shank 91 and a hollow head 92. Shank 91 has an axial screw threaded opening 93. The members 90 are mounted on mold section 26, same as are members 35. Screws 34 hold the shanks in place. Screwed or otherwise attached to said hollow heads 92, and closing them, are vertical plates 94c. The doll's head will be molded around the heads 92, 94 forming a front molded head portion 62, eye openings 63, portions 64a molded around heads 92, 94 and front wall portions 65a at the front surfaces of plates 94.

Screwed into each opening 93 is a screw 100 having a square outer end 100a, and a pointed conical inner end 101. Within the hollow head 92 are a pair of symmetrical spring pressed opposed pins 103 having inner heads 104 and outwardly extending pins or shanks 105 passing through openings 106 in the head. Coil compression springs 107 are interposed between heads 104 and the outer wall of the head 92. The point of the cone 101 is between the heads 104 during the molding operation as in FIG. 13a, to mold openings 110 in walls 64a.

When molding, the screw 100 is in position of FIG. 13a to spread pins 103 apart. After molding, the screws 100 are retracted by applying a wrench to ends 100a, to permit springs 107 to retract pins 103, leaving openings 110 to receive the axles 80 of the doll's eyes 46. Walls 65a may be cut away by dies 70, as in FIG. 9, or in any other suitable manner.

Figure 14:
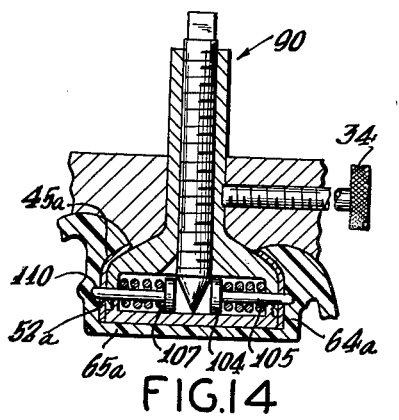
FIG. 14 is a view similar to FIG. 13 and illustrating a modified construction using the shell but without eyelets.
Figure 4:
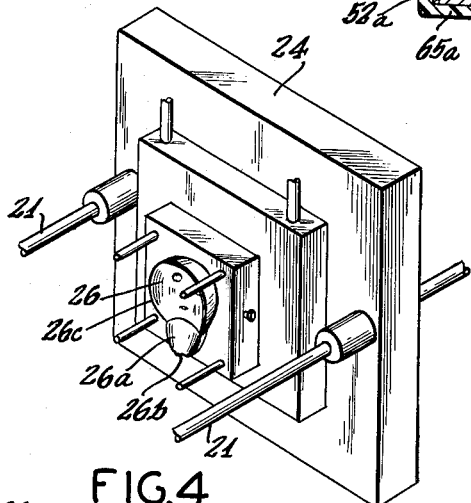
FIG. 4 is a perspective view of the other end of the apparatus.

As shown in FIG. 14, shells 45a without tubes 53 may be used with the apparatus of FIGS. 13, 13a so that the axles 80 will pass through openings 52a in the shells and openings 110 in the sockets 64a. Members 90 may be removed after cutting away walls 65a.

Figure 15:
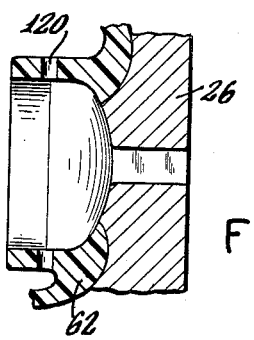
FIG. 15 is a view similar to FIG. 9 and illustrating a still further modification of the invention.
Figure 5:
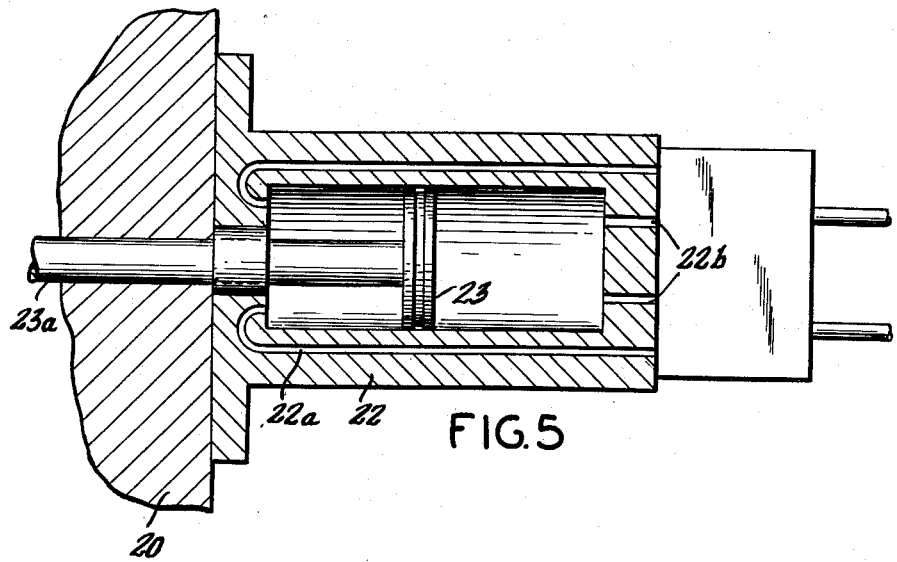
FIG. 5 is a cross-sectional view taken on line 5—5 of FIG. 1.
Figure 6:
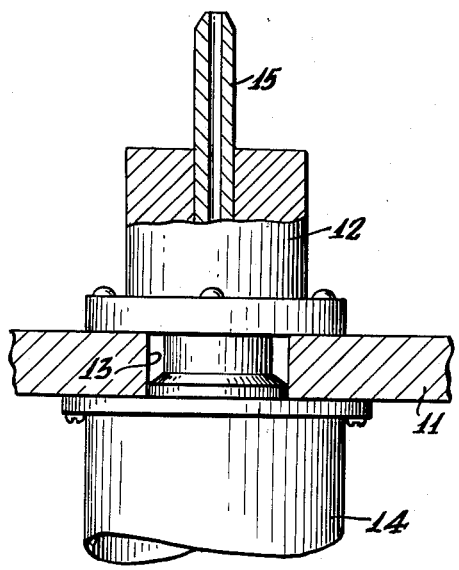
FIG. 6 is a cross-sectional view taken on line 6—6 of FIG. 2.
Figure 7:
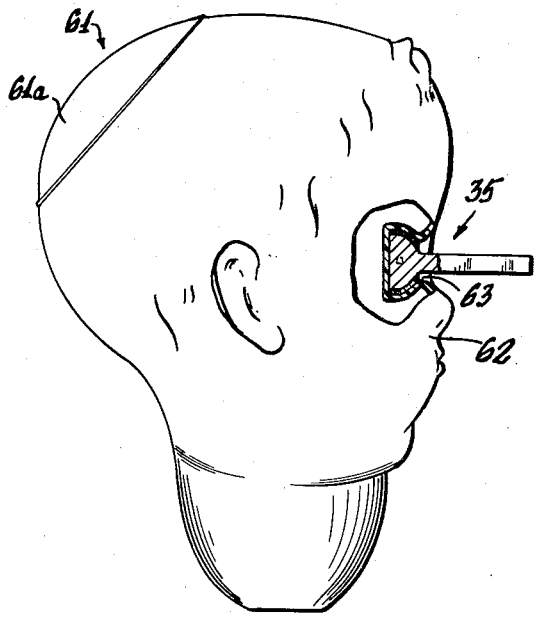
FIG. 7 is a persective view of a doll's head blow molded on the apparatus of FIGS. 1 and 2 and with parts in cross-section, and showing part of the apparatus for forming the eye sockets.

Openings 120 for the axles of the doll's eyes may also be made by using the socket molding members 35 without shells, as shown in FIG. 15. The holes 120 may be made with any heated pins by hand or in any other suitable manner after members 35 are removed.

In FIGS. 16–21, there is shown another modified form of the invention. In said figures, the same mold section 26 is used. However, instead of mold members 35, there is used mold members 35b, each having a head 130 and a shank 131 of polygonal transverse cross-section. Said head 130 has a convex surface 133 which is nested in concave surface 30 of mold section 26, and extends therebeyond, meeting the inner surface of said mold section at an outline defining a doll's eye opening.

At the inner end of surface 133 are part cylindrical surfaces 134. At the inner end of surfaces 134 are part cylindrical surfaces 135 of greater diameter. Head 132 has a flat inner surface 136. Said head is formed with a pair of horizontal opposed ribs 137 extending from the surface 136 to the junction of surfaces 134, 133.

There are two members 130 employed. The blow molding is as heretofore described, to mold socket members 140 extending inwardly from the front face 141 of the doll's head 142. Sockets 140 each have portions 143 contacting convex surfaces 133 and cylindrical surfaces 134 and 135; a vertical wall 144 contacting surface 136 and portions 145 surrounding the ribs 137. Said sockets 140 are formed with inner slots 146 formed by the ribs 137, and with an annular groove 147 communicating with said slots. It will be noted that the slots 146 extend beyond the annular groove 147.

Doll's eyes 46 may be inserted in the sockets 140 with axles 80 received in the closed ends of slots 146.

The flat wall 144 may be cut away by means of dies 70a (FIG. 16) or in any other suitable manner, and the members 35b removed.

A metal ring 150 may be fitted into groove 147 to hold the doll's eye 46 from coming out and to complete bearings for the axles 80.

Preferably, the width of rings 150 is less than width of grooves 147, leaving some socket wall beyond the ring. This extending socket portion may be heated and pressed inwardly to hold the rings against coming out. The rings 150 may also be force or drive fitted into place so that they do not come out.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. Apparatus for making a doll's head comprising complementary rear and front doll's head mold sections, a pair of members slidably and removably mounted on said front mold section, and having heads at their rear ends, formed with front convex surfaces meeting the inner surface of said front mold section along outlines defining doll's eye openings, and also having opposed, horizontally aligned means on the head of each of said members projecting outwardly therefrom to form doll's eye axle receiving openings, said members also having shanks slidably passing through passages in said front mold section, and means to blow mold heated thermoplastic material against the inner surfaces of said mold sections and around said heads of said members and horizontally aligned means, to form a doll's head with doll's eye openings and sockets around said members, surrounding the eye openings, with openings in said sockets to receive axles of dolls' eyes inserted into said sockets.

2. The combination of claim 1, said axle receiving opening forming means comprising aligned opposed pins slidable on said members, and means to project said pins outwardly away from each other, and to retract said pins inwardly toward each other.

3. The combination of claim 1, said pair of members having die edges, and dies cooperating with said die edges to die cut portions of said sockets.

4. The combination of claim 1, said doll's eye axle forming means comprising shells on said members provided with outwardly extending, aligned tubular members closed at their outer ends and opening into the shells.

5. Apparatus comprising a female doll's head mold, a pair of members having heads formed with convex front surfaces meeting the inner surface of the mold at continuous lines defining dolls' eyes, said heads having surfaces extending rearwardly of the rear ends of said convex surfaces and of a cross-sectional dimension not substantially smaller than that of the rear ends of said convex surfaces, said members having shanks slidable and readily removable in openings in the mold section and centrally located relative to said eye openings, and a pair of aligned, outwardly extending projections on each head, whereby to form openings for receiving axles of dolls' eyes, upon applying mold material against the inside of said mold and over said members and projections.

6. A method comprising removably mounting at the inside of a female doll's head mold member, a pair of members having surfaces meeting the inner surface of said head along outlines defining doll's eyes, said members each having a pair of aligned, outwardly extending projections, blow molding mold material to the inside of the mold member and around said pair of members and said projections, to form a molded head having eye openings, sockets surrounding said openings and axle receiving openings, and cutting away rear parts of the sockets, so that said sockets open rearwardly, and removing said pair of members through the rear open ends of the sockets.

7. The combination of claim 6, in which the cutting away of parts of said sockets is done by moving said members toward dies cooperating therewith.

8. The process of claim 6 wherein a shell is placed on each of the members prior to mounting said pair of members on the mold members, with said shell having openings aligned with said projections, said projections being tubes opening into the shell at said openings in the shell and said tubes being closed at their outer ends.

9. A process comprising blow molding a doll's head with eye openings and sockets inside the head and surrounding the eye openings, forming a pair of horizontally aligned, opposed openings in each socket, thereafter cutting away a rear wall of said socket to make said sockets open rearwardly, thereafter inserting into said sockets through the rear ends of the sockets, doll's eyes having axles, and engaging the axles in said opposed openings.

10. The process of claim 9 in combination with the step of imbedding during the molding operation, shells having openings and tubes closed at their outer ends in communication with said openings, said tubes being aligned with the openings in the sockets, said tubes being adapted to accommodate said eye axles.

References Cited in the file of this patent

UNITED STATES PATENTS

| 1,177,393 | Denivelle | Mar. 28, 1916 |
| 1,863,209 | Shank | June 14, 1932 |
| 2,710,492 | Wilcock | June 14, 1955 |
| 2,763,031 | Rekettye | Sept. 18, 1956 |
| 2,784,455 | Pulaski | Mar. 12, 1957 |
| 2,788,610 | Bashover | Apr. 16, 1957 |
| 2,812,551 | Chupa | Nov. 12, 1957 |
| 2,870,571 | Bashover | Jan. 27, 1959 |
| 2,888,714 | Bray | June 2, 1959 |
| 2,963,818 | Brudney | Dec. 13, 1960 |
| 2,967,330 | Tommarchi | Jan. 10, 1961 |
| 2,975,473 | Hagen et al. | Mar. 21, 1961 |
| 3,015,856 | Cohn | Jan. 9, 1962 |

FOREIGN PATENTS

| 1,105,529 | France | July 6, 1955 |
| 203,385 | Australia | Sept. 27, 1956 |